3,160,667
METHODS FOR PRODUCING PEROXIDIC MATERIALS
Kazuo Higashiuchi, Chicago, Ill., and Edward J. Schwoegler, Munster, Ind., assignors to J. R. Short Milling Company, Chicago, Ill., a corporation of Illinois
No Drawing. Filed Dec. 14, 1960, Ser. No. 75,692
5 Claims. (Cl. 260—610)

This invention relates to organic peroxides and more particularly to a method for producing compositions containing relatively large proportions of the water soluble compounds 2,2-dihydroperoxy propane and bis-(1,1'-hydroperoxy 1,1'-methyl) diethyl peroxide, with the weight of the former equal to at least three times the weight of the latter.

As disclosed in copending application Serial Number 15,783, filed June 23, 1959, on behalf of Herbert O. Renner, now U.S. Patent 3,085,014, issued April 9, 1963, acetone and aqueous hydrogen peroxide can be reacted under conditions such that, though the resulting reaction product mixture is at least substantially free from cyclic acetone peroxides in solid form, the same contains a major proportion of acyclic peroxides in solution. Thus, a typical reaction product mixture prepared in accordance with application Serial Number 15,783 contains at least 30% by weight, or more, of total organic peroxides, at most only a negligible proportion of which is made up by the cyclic dimeric and trimeric acetone peroxides. Of this organic peroxide content, a substantial proportion has been found to be bis-(1,1'-hydroperoxy 1,1'-methyl) diethyl peroxide, almost all of the remainder being 2,2-dihydroperoxy propane, if the reaction is properly carried out, and only negligible amounts of more highly polymeric acyclic acetone peroxides being present.

As disclosed in application Serial Number 75,774, filed December 14, 1960, by Kazuo Higashiuchi, now U.S. Patent 3,077,412, issued February 12, 1963, 2,2-dihydroperoxy propane is superior, as a flour bleaching and maturing agent, to both bis-(1,1'-hydroperoxy 1,1'-methyl) diethyl peroxide and reaction mixtures containing the latter as the primary organic peroxide. Thus, a composition wherein the organic peroxide content consists essentially of 2,2-dihydroperoxy propane has a flour bleaching capability more than 33% greater than one wherein the organic peroxide content consists essentially of bis-(1,1'-hydroperoxy 1,1'-methyl) diethyl peroxide, and at least 33% greater than one containing both 2,2-dihydroperoxy propane and bis-(1,1'-hydroperoxy 1,1'-methyl) diethyl peroxide with a ratio of the former to the latter of, for example, 2:1. Despite the superior bleaching power of 2,2-dihydroperoxy propane, it must be recognized that processing steps required for obtaining that compound in reasonably pure form are expensive, so that it is desirable to capitalize on the superior capabilities of 2,2-dihydroperoxy propane without undertaking isolation of that compound.

A general object of the present invention is to devise a method for reacting acetone and hydrogen peroxide in such manner as to obtain a high total organic peroxide yield consisting essentially of 2,2-dihydroperoxy propane and bis-(1,1'-hydroperoxy 1,1'-methyl) diethyl peroxide with the weight of the former being at least three times that of the latter.

Another object is to provide such a method capable of producing 2,2-dihydroperoxy propane and bis-(1,1'-hydroperoxy 1,1'-methyl) diethyl peroxide in weight ratios up to 10:1 and even higher, so that 2,2-dihydroperoxy propane is made the major peroxide of the reaction product mixture and special steps for recovering or concentrating that compound are avoided.

We have discovered that various specific conditions affecting the reaction of acetone and hydrogen peroxide act decidedly to promote the formation of 2,2-dihydroperoxy propane. First, and of especial importance, we have discovered that phosphoric acid acts in some fashion to promote production of 2,2-dihydroperoxy propane at the expense of formation of bis-(1,1'-hydroperoxy 1,1'-methyl) diethyl peroxide, and that the use of this particular acid as the catalyst allows selection of other reaction conditions, which favor production of 2,2-dihydroperoxy propane, without danger of material formation of cyclic trimeric acetone peroxide. Next, we have found that the proportion of 2,2-dihydroperoxy propane in the reaction product mixture is increased by maintaining the molar ratio of hydrogen peroxide to acetone in the range of from 1.5:1 to 6:1, with best results being attained with the narower range of from 2:1 to 3:1, and by employing water in an amount equal to 5–95%, and advantageously 35–55%, of the reaction mixture weight, reaction being accomplished by maintaining the reaction mixture at a temperature of from −20° C. to 35° C., and at a temperature of from −10° C. to +15° C. for best results, for a period of from 10 minutes to 6 hours, depending upon the amount of catalyst and the temperature employed. As described in said copending application Serial Number 75,774, the reaction time increases with a decrease in either temperature or the proportion of catalyst, and decreases when either the temperature or the proportion of catalyst is increased. When these specific process conditions are employed, we have found that a yield of organic peroxide amounting, in hydrogen peroxide equivalents, to at least 60% of the hydrogen peroxide starting material will be obtained, with the organic peroxide formed consisting essentially of 2,2-dihydroperoxy propane and bis-(1,1'-hydroperoxy 1,1'-methyl) diethyl peroxide in a weight ratio of at least 3:1.

In considering the molar ratio given above for hydrogen peroxide to acetone, it must be recognized that the process is aided by gradual addition of the acetone over at least a major portion of the reaction time and that the molar ratio refers to all of the acetone employed. In considering the proportion of water, the percentages set out above are for added water and do not take into account water produced by the reaction. Conveniently, all of the added water is provided by employing an aqueous hydrogen peroxide solution of the proper concentration.

The following example illustrates the marked superiority of phosphoric acid as a catalyst when high proportions of 2,2-dihydroperoxy propane are to be produced.

*Example 1*

In each of runs 1A–1F, tabulated below, acetone and aqueous hydrogen peroxide were combined to provide a molar ratio of hydrogen peroxide to acetone of 2.0, and reaction was accomplished by maintaining the reaction mixtures at 15° C. for the time periods indicated.

| Run | Catalyst | | Time (hours) | Ratio of 2,2-dihydroperoxy propane to bis-(1,1'-hydroperoxy 1,1'-methyl) diethyl peroxide |
|---|---|---|---|---|
| | Acid | Percent | | |
| 1A | $HNO_3$ | 0.15 | 1 | 2.77 |
| 1B | $HNO_3$ | 0.15 | 2 | 2.47 |
| 1C | $H_2SO_4$ | 0.15 | 1 | 3.08 |
| 1D | $H_2SO_4$ | 0.15 | 2 | 2.6 |
| 1E | $H_3PO_4$ | 0.15 | 1 | 5.2 |
| 1F | $H_3PO_4$ | 0.15 | 2 | 4.3 |

While a 3:1 ratio of 2,2-dihydroperoxy propane to bis-(1,1'-hydroperoxy 1,1'-methyl) diethyl peroxide was obtained in run 1C, involving a reaction time of 1 hour, this ratio fell sharply below the desired 3:1 lower limit when the reaction time was extended to 2 hours. Hydrochloric acid is not included here because of its marked tendency to promote the formation of cyclic trimeric acetone peroxide. Thus, hydrochloric acid has been found to cause production of the undesirable cyclic trimer about 5 times faster than does nitric acid and about 10 times faster than does sulfuric acid.

Employing phosphoric acid as the catalyst, it has been found that the best ratio of 2,2-dihydroperoxy propane to bis-(1,1'-hydroperoxy 1,1'-methyl) diethyl peroxide is obtained when the catalyst is employed in an amount equal to 1–6% by weight, while the total yield of the two peroxides can be increased, but at the expense of a decrease in the relative proportion of 2,2-dihydroperoxy propane, by increasing the amount of phosphoric acid above 6%. The following example is illustrative.

*Example 2*

For all of runs 2A–2C, tabulated below, and all catalyzed by phosphoric acid, hydrogen peroxide and acetone were employed in a molar ratio of 2.5:1, and reaction was accomplished by maintaining the reaction mixture at 15° C. for 30 minutes, the acetone being added gradually over the reaction period.

| Run | $H_3PO_4$ (percent by wt) | Ratio of 2,2-dihydroperoxy propane to bis-(1,1'-hydroperoxy 1,1'-methyl) diethyl peroxide | Percent Conversion of $H_2O_2$ |
|---|---|---|---|
| 2A | 1.28 | 6.45 | 67 |
| 2B | 5.60 | 6.83 | 63 |
| 2C | 12.90 | 3.50 | 71 |

In general, lower reaction temperatures favor production of 2,2-dihydroperoxy propane, as indicated by the following example.

*Example 3*

Runs 3A and 3B, tabulated below, were made separately. In each run, the molar ratio of hydrogen peroxide to acetone was 2.5:1, the acetone being added over the entire reaction period. Both reaction mixtures were catalyzed by phosphoric acid at the rate of 12 g. acid per mole of acetone. The reaction time was 30 minutes for each run.

| Run | Temp. (° C.) | Ratio of 2,2-dihydroperoxy propane to bis-(1,1'-hydroperoxy 1,1'-methyl) diethyl peroxide |
|---|---|---|
| 3A | +15 | 5.1 |
| 3B | −10 | 6.8 |

The amount of water employed in the reaction mixture has been found to have a marked effect on the relative proportion of 2,2-dihydroperoxy propane, as illustrated by the following example.

*Example 4*

Runs 4A–4C, tabulated below, were each made with an initial reaction mixture containing 23.4 g. acetone, 34.1 g. hydrogen peroxide (100%), and 3 g. phosphoric acid per mole acetone, the water content being as indicated below and reaction being accomplished by maintaining the reaction mixtures at 15° C. for 30 minutes in each run.

| Run | Water (percent by wt.) | Ratio of 2,2-dihydroperoxy propane to bis-(1,1'-hydroperoxy 1,1'-methyl) diethyl peroxide |
|---|---|---|
| 4A | 52.2 | 10.0 |
| 4B | 36.0 | 6.5 |
| 4C | 6.5 | 3.4 |

The increased proportion of 2,2-dihydroperoxy propane obtained by increasing the proportion of water is accompanied by a decrease in total yield of organic peroxide and it is accordingly most advantageous to keep the proportion of water in the range of 35–55%.

As already indicated, higher proportions of hydrogen peroxide in the initial reaction mixture promote formation of 2,2-hydroperoxy propane, and a molar ratio of at least 1.5:1 for hydrogen peroxide to acetone is employed in accordance with the invention. Addition of the acetone over a major portion of the reaction period is also helpful in this regard, since gradual addition of the acetone provides a higher ratio of hydrogen peroxide to acetone in the early stages of the reaction. The phenomenon is illustrated by the following example.

*Example 5*

Runs 5A and 5B, tabulated below, each employed 23.4 g. acetone, 68.25 g. aqueous hydrogen peroxide (50% $H_2O_2$), and 3 g. phosphoric acid per mole acetone. In each run, reaction was accomplished by maintaining the reaction mixture at 15° C. for 30 minutes. In run 5A, all of the acetone was added initially. In run 5B, the acetone was added gradually throughout the 30 minute reaction period.

| Run | Ratio of 2,2-dihydroperoxy propane to bis-(1,1'-hydroperoxy 1,1'-methyl) diethyl peroxide |
|---|---|
| 5A | 5.0 |
| 5B | 6.5 |

What is claimed is:

1. The method for obtaining from acetone and hydrogen peroxide a yield of organic acyclic peroxides consisting essentially of 2,2-dihydroperoxy propane and bis-(1,1'-hydroperoxy 1,1'-methyl) diethyl peroxide and amounting in hydrogen peroxide equivalents to at least 60% of the hydrogen peroxide employed as a starting material, with the weight ratio of 2,2-dihydroperoxy propane to bis-(1,1'-hydroperoxy 1,1'-methyl) diethyl peroxide being at least 3:1, comprising combining acetone, hydrogen peroxide, water and 0.15–15% by weight of phosphoric acid, and maintaining the resulting reaction mixture at a temperature of from −20° C. to 35° C. for a time period of from 6 hours to 10 minutes, said time period depending upon and being inversely related to the proportion of catalyst and the temperature employed, the molar ratio of hydrogen peroxide to acetone for the total acetone employed being from 1.5:1 to 6:1, and the water employed amounting to 5–95% of the reaction mixture.

2. The method of claim 1 wherein the molar ratio of hydrogen peroxide to acetone is from 2:1 to 3:1.

3. The method of claim 2 wherein the reaction mixture is maintained at a temperature of from −10° C. to 15° C. and the proportion of phosphoric acid employed is 1.5–6% by weight.

4. The method of claim 1 wherein the water employed amounts to 35–55% by weight of the reaction mixture.

5. The method of claim 4 wherein the reaction mixture is maintained at a temperature of from −10° C. to 15° C. and the proportion of phosphoric acid employed is 1.5–6% by weight.

References Cited by the Examiner

UNITED STATES PATENTS 3,003,000  10/61  Milas _____ 260—610
3,085,014  4/63  Renner _____ 260—610 X

OTHER REFERENCES

Criegee et al.: Ber. deut. chem., 89:1714–1718 (5 pages) (1956).

LEON ZITVER, *Primary Examiner.*

CHARLES B. PARKER, *Examiner.*